(12) United States Patent
Hussain et al.

(10) Patent No.: US 8,030,900 B2
(45) Date of Patent: Oct. 4, 2011

(54) CIRCUITS AND METHODS FOR CONTROLLING POWER IN A BATTERY OPERATED SYSTEM

(75) Inventors: M Abid Hussain, Los Altos, CA (US); Takashi Kanamori, San Jose, CA (US)

(73) Assignee: Summit Microelectronics, Inc., Sunnyvale, CA (US)

( * ) Notice: Subject to any disclaimer, the term of this patent is extended or adjusted under 35 U.S.C. 154(b) by 989 days.

(21) Appl. No.: 11/897,410

(22) Filed: Aug. 29, 2007

(65) Prior Publication Data

US 2008/0054855 A1    Mar. 6, 2008

Related U.S. Application Data

(60) Provisional application No. 60/842,588, filed on Sep. 5, 2006.

(51) Int. Cl.
*H02J 7/00*    (2006.01)

(52) U.S. Cl. .......................................... 320/135; 320/136

(58) Field of Classification Search .................. 320/135, 320/136, 103, 140, 152, 157, 162; 323/282
See application file for complete search history.

(56) References Cited

U.S. PATENT DOCUMENTS

| | | | |
|---|---|---|---|
| 5,723,970 A | 3/1998 | Bell | |
| 6,353,894 B1 * | 3/2002 | Pione | 713/340 |
| 6,369,461 B1 | 4/2002 | Jungreis et al. | |
| 6,507,172 B2 | 1/2003 | Sherman | |
| 6,946,817 B2 * | 9/2005 | Fischer et al. | 320/132 |
| 7,486,046 B2 * | 2/2009 | Chou | 320/107 |
| 7,541,776 B2 * | 6/2009 | Tupman et al. | 320/134 |
| 7,573,242 B2 * | 8/2009 | Bayne et al. | 320/136 |
| 7,710,079 B2 * | 5/2010 | Martin et al. | 320/164 |
| 7,906,940 B2 * | 3/2011 | Veselic et al. | 320/158 |

OTHER PUBLICATIONS

International Search Report (corresponding foreign case), PCT/US07/19189, mailed Mar. 5, 2008.

* cited by examiner

*Primary Examiner* — Richard V Muralidar
(74) *Attorney, Agent, or Firm* — Chad R. Walsh; Fountainhead Law Group P.C.

(57) ABSTRACT

Embodiments of the present invention include systems and methods of controlling power in battery operated systems. In one embodiment, the present invention includes a switching regulator for boosting voltage on a depleted battery to power up a system. The system may communicate with an external system to increase the current received from the external system. Embodiments of the present invention include circuits for controlling power received from external power sources such as a USB power source. In another embodiment, input-output control techniques are disclosed for controlling the delivery of power to a system or charging a system battery, or both, from an external power source.

43 Claims, 5 Drawing Sheets

CIRCUITS AND METHODS FOR CONTROLLING POWER IN A BATTERY OPERATED SYSTEM

CROSS REFERENCE TO RELATED APPLICATIONS

This invention relates to and claims priority from U.S. Provisional Patent Application No. 60/842,588 filed Sep. 5, 2006 naming M. Abid Hussain and Takashi Kanamori as inventors, the contents of which is hereby incorporated herein by reference in its entirety.

BACKGROUND

The present invention relates to power control, and in particular, to circuits and methods for controlling power in a battery operated system.

Batteries have long been used as a source of power for a variety of electronic systems. Batteries provide energy in the form of electric currents and voltages that allow circuits to operate. However, the amount of energy stored in a battery is limited, and batteries lose power when the electronic devices are in use. When a battery's energy supply becomes depleted, the battery's voltage will start to fall from its rated voltage. When the voltage on the battery falls below a threshold, the electronic device relying on the battery for power will no longer operate properly. Such thresholds will be different for different types of electronic devices.

Additionally, different electronic systems may draw different amounts of current on one or more power supply input terminals. Moreover, the current drawn in any given system, or any portion of the system, may vary over time as the system's electronics enter different modes of operation. For example, an electronic system that includes an internal magnetic drive (i.e., a hard drive) may draw more current, and hence more power, when powering up the circuits for interfacing with the hard drive (e.g., motor driver circuitry). Typically, the circuits in an electronic system will not operate properly unless the system receives one or more power supply voltages at or above one or more corresponding thresholds. For example, some systems may require one power supply voltage of at least 3.5 volts to operate properly. When the power supply voltage is below a minimum power supply threshold voltage, the system may not be able to power up.

One problem associated with battery operated systems results from limits on external power sources supplying voltages and currents. Many sources of power have limits on the amount of current the power source can provide. In some situations, a user may desire to both operate the system and charge the battery at the same time. However, limits on the available current may cause battery charging to be suboptimal. For example, if an external power source has a maximum available current, some modes of system operation may approach or exceed this maximum, causing the voltage on the external power source to drop. Such a voltage drop may cause problems with the external system. Additionally, it may be desirable to efficiently charge the battery and operate the system at the same time. However, as the system draws more current, there is less current for use in charging the battery. It is generally desirable to improve battery charging while the system is drawing current, and in particular, it is desirable to improve battery charging when the system draws current close to the current limit of the external power source.

Another problem associated with battery operated systems is that some external power sources may have different current modes, and may require data communication with the battery operated system to move from one current mode to another. For example, USB Host systems are capable of providing voltage (e.g., 5 volts) and current that may be used for powering a system and/or charging the systems battery. However, USB systems may initially be configured in a first current mode that only provides up to 100 mA of current. A battery operated system may communicate with the USB Host in a process sometimes referred to as "enumeration," and the USB Host may then change to another current mode capable of providing up to 500 mA of current. However, 100 mA may not be sufficient current to power the battery operated system. Moreover, if the voltage on the system battery is depleted below a minimum threshold for proper system operation (e.g., below 3.5 volts in a 5 volt system), then the system will not be able to power up. Accordingly, the system will not be able to communicate with the USB Host. Consequently, even though the USB Host may be capable of delivering 5 volts and 500 mA of current to the system, which may be used for charging the battery and/or powering up other system electronics, the USB Host may never transition into a higher current mode because the battery operated system does not have the initial power to turn on and communicate with the USB Host.

Thus, there is a need for improved power control in a battery operated system. The present invention solves these and other problems by providing circuits and methods for controlling power in a battery operated system.

SUMMARY

Embodiments of the present invention include techniques for controlling power in a a battery operated system. Some embodiments include a switching battery charger that can be used to boost battery voltages to power system electronics. Other embodiments include circuits for controlling the power delivered to system electronics when the battery is charging during system operation.

In one embodiment, the present invention includes a switching regulator for boosting voltage on a depleted battery to power up a system. The system may communicate with an external system to increase the current received from the external system. Embodiments of the present invention include circuits for controlling power received from external power sources such as a USB power source. In another embodiment, input-output control techniques are disclosed for controlling the delivery of power to a system or charging a system battery, or both, from an external power source.

In another embodiment, the present invention includes an electronic circuit comprising a first input for receiving a voltage from an external system, a first output coupled to a load, a second output coupled to an electronic system, and a switching regulator capable of boosting a voltage on the load, and in accordance therewith, increasing a voltage on the second output.

In one embodiment, the load is a battery.

In one embodiment, the switching regulator generates a boosted voltage and the boosted voltage is coupled to the second output.

In one embodiment, the switching regulator is a bidirectional switching regulator.

In one embodiment, the switching regulator is a boost switching regulator, the electronic circuit further comprising a buck regulator having an input coupled to the first input and an output coupled to the load.

In another embodiment, the present invention includes an electronic circuit comprising an input for receiving a voltage and a first current from a USB power source, a first output coupled to a battery, a second output coupled to an electronic system, and a bidirectional switching regulator, wherein the bidirectional switching regulator operates in a boost mode if a voltage on the battery is below a first threshold, and in accordance therewith, generates a voltage generates a voltage greater than the threshold.

In one embodiment, the electronic system communicates with a USB controller, and in accordance therewith, the USB power source increases the first current.

In one embodiment, the present invention further comprises an input control circuit for allowing the input and the second output to have different voltage values.

In one embodiment, the input control circuit provides a regulated current to the second output.

In one embodiment, the input control circuit detects a current and shuts down the switching regulator.

In one embodiment, the bidirectional switching regulator operates in a buck mode if the voltage on the second output is above a second threshold.

In one embodiment, the first threshold and the second threshold are the same.

In one embodiment, the present invention includes an electronic circuit comprising an input for receiving a voltage and a first current from an external system, a first output coupled to a battery, a second output coupled to an electronic system, and a bidirectional switching regulator, wherein the bidirectional switching regulator operates in a boost mode if a voltage on the battery is below a first threshold, and in accordance therewith, generates a voltage generates a voltage on the second output greater than the threshold based on the voltage on the battery.

In one embodiment, the electronic system communicates with the external system, and in accordance therewith, the external system increases the value of the first current.

In one embodiment, the present invention further comprises an input control circuit for allowing the input and the second output to have different voltage values.

In one embodiment, the input control circuit provides a regulated current to the second output.

In one embodiment, the input control circuit detects a current and shuts down the switching regulator.

In one embodiment, the bidirectional switching regulator operates in a buck mode when the voltage on the second output is above a second threshold.

In one embodiment, the first threshold and the second threshold are the same.

In another embodiment, the present invention includes a method comprising receiving an external voltage from an external power source on a first circuit node, sensing the external voltage, sensing a second voltage on a battery, boosting the second voltage on the battery to a third voltage greater than a threshold voltage if the second voltage is below said threshold voltage, and coupling the third voltage to a second node to power system electronics.

In another embodiment, the present invention includes a method comprising detecting an external voltage from an external system, sensing the external voltage, sensing a second voltage on a battery, boosting the second voltage on the battery to a third voltage greater than a threshold voltage if the second voltage is below said threshold voltage, coupling the third voltage to a second node to provide power to a first system, and sending data from the first system to the external system to change the external system from one current mode to a second current mode, wherein the second current mode is capable of providing a greater amount of current than the first current mode.

In another embodiment, the present invention includes a method comprising detecting an external USB voltage from an external system, sensing the USB voltage, sensing a second voltage on a battery, boosting the second voltage on the battery to a third voltage greater than a threshold voltage if the second voltage is below said threshold voltage, coupling the third voltage to a second node to provide power to a first system, and sending data from the first system to the external system to change from one USB current mode to a second USB current mode capable of providing a greater amount of current than the first USB current mode.

In another embodiment, the present invention includes a method of providing power to system electronics comprising coupling a battery to said system electronics if a voltage on the battery is greater than a threshold to power up said system electronics, and boosting the voltage on the battery to a value that is greater than the threshold if the voltage on the battery is less than the threshold.

In another embodiment, the present invention includes an electronic circuit comprising a first input for receiving a voltage from an external system, a first output coupled to a battery, a second output coupled to a power supply input for system electronics, and a switching regulator, wherein the switching regulator is configured to boost a voltage on the battery if the voltage on the second output is below a first voltage level, and in accordance therewith, generate a voltage on the second output that is greater than a voltage on the battery.

In one embodiment, the electronic circuit further comprises a switch coupled between the first output and the second output, wherein the switch is closed if the voltage on the battery is above a threshold value.

In one embodiment, the switching regulator is a bidirectional switching regulator, and wherein the switching regulator is configured to receive the voltage from the external system and generate a voltage on the first output that is less than the voltage from the external system if the voltage on the second output is above the first voltage level.

In one embodiment, the switching regulator comprises a boost switching regulator and a buck regulator, and wherein the switching regulator is configured to receive the voltage from the external system and generate a voltage on the first output that is less than the voltage from the external system if the voltage on the second output is above the first voltage level.

In one embodiment, the electronic circuit further comprises a current detector coupled between the first input and second output.

In one embodiment, the electronic circuit further comprises a regulator coupled between the first input and second output, wherein the regulator limits the current from the external power supply.

In one embodiment, the electronic circuit further comprises a transistor coupled between the first input and second output, wherein the first transistor is configured to limit the current from the external power supply if the current through the first transistor is greater than a first current value.

In one embodiment, the external system is a USB system.

In one embodiment, the system electronics communicates with a USB controller, and in accordance therewith, the USB power source increases a current into the first input.

In one embodiment, the electronic circuit further comprises an input control circuit for allowing the first input and the second output to have different voltage values.

In one embodiment, the input control circuit provides a regulated current to the second output.

In one embodiment, the input control circuit detects a current and shuts down the switching regulator.

In one embodiment, the electronic circuit is an integrated circuit.

In one embodiment, the electronic circuit further comprising a control circuit coupled between the first input and the second output, wherein the control circuit turns off said switching regulator if the voltage on the second output is below a first voltage level.

In one embodiment, the present invention includes an electronic circuit comprising a first input for receiving a voltage from an external USB system, a first output coupled to a battery, a second output coupled to a power supply input for system electronics, a switching regulator, wherein, if the voltage on the battery is below a first voltage level sufficient to power up said system electronics, and if the voltage on the second output is below the first voltage level after the external USB system is coupled to the first input, the switching regulator is configured to boost a voltage on the battery, and in accordance therewith, generate a voltage on the second output that is greater than a voltage on the battery to power up said system electronics.

In one embodiment, the switching regulator is a bidirectional switching regulator operating in a boost mode to generate said voltage on the second output terminal and operating in a buck mode to charge said battery if the voltage on the second output is greater than a threshold.

In one embodiment, the electronic circuit further comprises a control circuit coupled between the first input and the second output, wherein the control circuit turns off said switching regulator if a current received from the external USB system increases above a maximum available current.

In one embodiment, the control circuit comprises a current detector and a transistor coupled in series, wherein the current detector limits the current in the transistor if the current received from the external USB system increases above a maximum available current.

In one embodiment, the electronic circuit further comprises a switch coupled between the first output and the second output, wherein the switch is closed if the voltage on the battery is above a threshold value.

In one embodiment, the present invention includes a method of powering an electronic system comprising receiving an external voltage from an external power source on a first circuit node, sensing the external voltage, sensing a voltage on a battery, boosting the voltage on the battery to a voltage greater than a threshold voltage if the second voltage on the battery is below said threshold voltage, and coupling the boosted voltage to the input of a system to power electronics is the system.

In one embodiment, the external system is a USB system and wherein said boosting is performed by a switching regulator.

In one embodiment, the method further comprises sending data from the system to the external USB system to change the external USB system from one current mode to a second current mode, wherein the second current mode is capable of providing a greater amount of current than the first current mode.

In one embodiment, the method further comprises reconfiguring the switching regulator from a boost mode to a buck mode after the external USB system changes to the second current mode, and in accordance therewith, charging said battery.

In one embodiment, the present invention includes a method of providing power to system electronics comprising coupling a battery to said system electronics if a voltage on the battery is greater than a threshold to power up said system electronics and boosting the voltage on the battery to a value that is greater than the threshold if the voltage on the battery is less than the threshold.

In one embodiment, the method further comprises receiving power from an external power source, wherein said coupling and said boosting are performed if a current from said external power source is insufficient to power said system electronics.

In one embodiment, the method further comprises supplementing the current from said external power source with a current from said battery.

In one embodiment, said boosting is performed by a switching regulator, the method further comprising reconfiguring the switching regulator from a boost mode to a buck mode after the system electronics are powered up, and in accordance therewith, charging said battery.

In one embodiment, the present invention includes a method of providing power to system electronics comprising coupling an external power source to said system electronics, and coupling a battery to said system electronics if the current into said system electronics exceeds a maximum current available from said external power source, wherein the battery is coupled to said system electronics through a switching regulator and a voltage on battery is increased by the switching regulator to turn on said system electronics.

In one embodiment, the method further comprises reconfiguring the switching regulator from a boost mode to a buck mode after the system electronics are powered up, and in accordance therewith, charging said battery.

In one embodiment, the external power system is a USB system, the method further comprising, prior to reconfiguring, communicating information between the system electronics and the USB system, and in accordance therewith, increasing the current available from the USB system.

In one embodiment, the method further comprises charging said battery and powering said system electronics at the same time.

In other embodiments, the present invention may be coupled to other power sources. The following detailed description and accompanying drawings provide a better understanding of the nature and advantages of the present invention.

DETAILED DESCRIPTION

Described herein are techniques for controlling power in battery operated electronics. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include obvious modifications and equivalents of the features and concepts described herein.

Figure 1A:
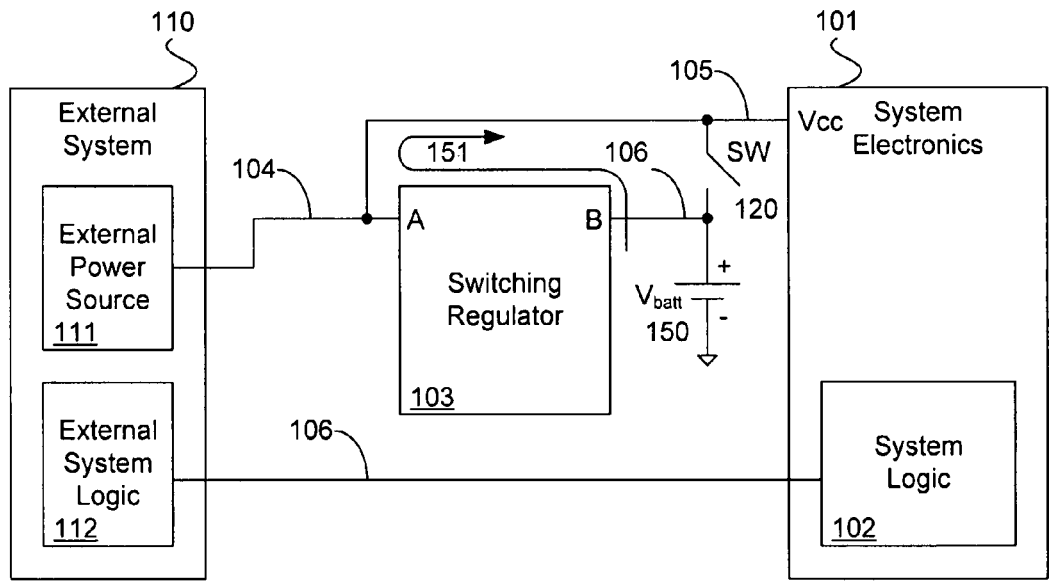
FIG. 1A illustrates an electronic circuit according to one embodiment of the present invention.

FIG. 1A illustrates an electronic circuit according to one embodiment of the present invention. Electronic circuitry 100A includes an external system 110 having a power source 111 and system logic 112. The external power source 111 may be used to power up the system electronics 101 or charge a battery 150, or both, of another electronic system. For example, external power source 111 may be coupled to the power supply input (e.g., Vcc) of system electronics 101. System electronics 101 may be any of a variety of electronics such as a cell phone, portable electronic music player, or a variety of other electronic systems or devices. Such systems or devices may include microprocessors, microcontrollers, memories, disc drives, or a variety of other electronic system components that may require certain voltages and currents to operate properly.

A battery 150 may be used to power up system electronics 101 when an external power source is not available. However, when the power in battery 150 becomes depleted, the voltage on the battery may fall below a threshold value necessary for operating some or all of the system electronics 101. For example, the system electronics may have a nominal voltage of 5 volts. While the system electronics may be able to operate at voltages below 5 volts, below a threshold voltage the system electronics may not be able to operate properly. In some systems, internal circuits monitor the input supply voltage and automatically shut down when the input supply voltage drops below a threshold value. Accordingly, the system electronics 101 may not operate properly below 3.5 volts, for example, or some other minimum system voltage threshold.

When battery 150 is depleted below the minimum system voltage threshold, the battery cannot provide sufficient voltage to the system electronics 101 to power up the system. In this case it may be desirable to power up the system from the external power source 111. However, in some cases the external power source 111 may provide a sufficient voltage to power up system electronics 101, but the external power source 111 may not be able to provide sufficient current to meet the current demands of the system electronics 101. According to one embodiment of the present invention, a switching regulator 103 is provided between the battery 150 and the power supply input of the system electronics. Switching regulator 103 is coupled to a first node 106. Node 106 is also coupled to the battery 150. Switching regulator 103 is also coupled to a second node 105, which is coupled to the power supply input ("Vcc") of system electronics 101. Switching regulator 103 receives the voltage on battery 150 as an input and increases the battery voltage to another voltage that has a value sufficiently high to power up the system electronics 101. Power 151 (e.g., voltage and current) is delivered from the battery 150 to the system electronics 101. This is sometimes referred to as "boosting" the voltage, and therefore, switching regulator may be referred to as a "boost" converter.

Electronic circuitry may also include a switch device ("SW") 120 that couples the voltage on the battery to node 105 to power the system electronics 101 when the voltage on the battery is high enough to power the system (e.g., when the battery is not depleted). Accordingly, the system may include two modes of operation. In a first mode, when the voltage on the battery is greater than a threshold to power up system electronics 101, the battery is coupled to the system electronics (e.g., through a switching device such as a transistor). In a second mode, when the voltage on the battery is less than the threshold to power up system electronics 101, the switching regulator 103 generates a voltage greater than the threshold voltage to power up the system electronics 101 using the voltage on the battery. In one embodiment, power may be provided to the system electronics by coupling the battery to said system electronics if a voltage on the battery is greater than a threshold to power up said system electronics, and boosting the voltage on the battery to a value that is greater than the threshold if the voltage on the battery is less than the threshold. Detection circuits (not shown) may also be used to detect the battery voltage or input voltage, or both, and configure the circuit to either boost the voltage on the battery or couple the battery voltage to the system electronics through switch 120.

In one embodiment, electronic circuits may be used to charge the battery 150 from the external power source 111 and use the voltage on battery 150 to drive the system electronics 101 at the same time. For example, in one embodiment, switching regulator 103 may be a bidirectional switching regulator. A bidirectional switching regulator may operate either in a "buck" or "boost" mode. In a buck mode, the switching regulator receives a voltage on a first node (e.g., at A in converter 103) and produces a lower voltage on a second node (e.g., at B). In boost mode, the switching regulator receives a voltage on the second node (at B) and generates a higher voltage on the first node (at A).

Figure 1B:
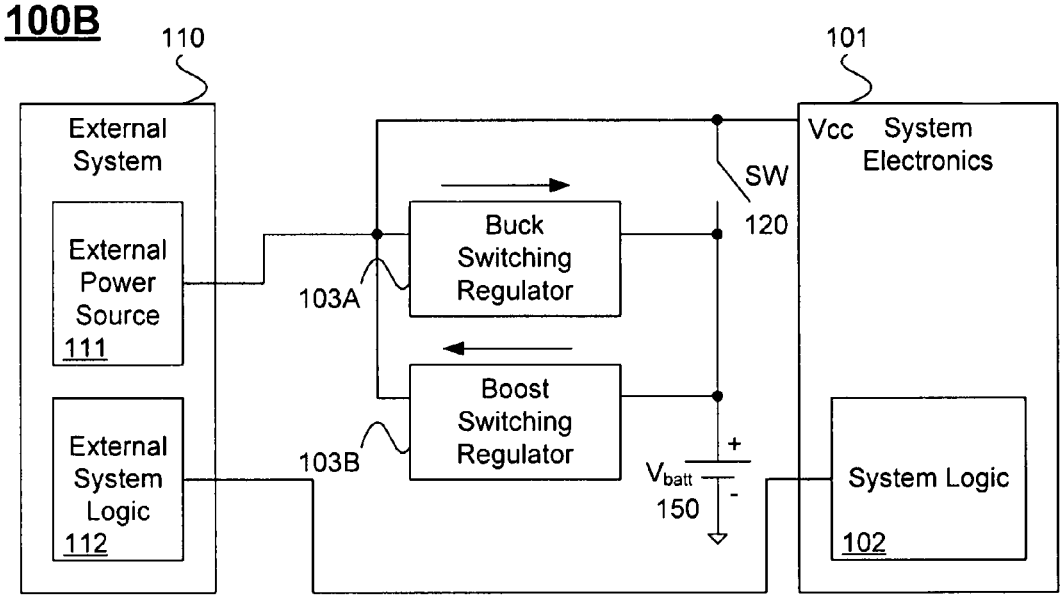
FIG. 1B illustrates an electronic circuit according to one embodiment of the present invention.

During battery charging, power is received from the external power source 111 and delivered to battery 150 through switching regulator 103. In some applications, the external power source may provide a voltage that is greater than the voltage on the battery (e.g., when the battery is depleted). Accordingly, switching regulator 103 receives the voltage from the external power source 111 as an input (at A) and decreases the external power source voltage to another lower voltage. In this mode of operation switching regulator 103 may be referred to as a "buck" converter. In this case, power (e.g., voltage and current) is delivered from the external power source 111 to the battery 150. The output (at B) of switching regulator 103 may be either a current or voltage, and in particular, either a constant current or constant voltage may be supplied to battery 150 for charging the battery. Example battery charging systems and methods that may be used are described in commonly-owned U.S. patent application Ser. No. 11/356,594, entitled "Switching Battery Charging Systems and Methods," naming M. Abid Hussain, Kenneth C. Adkins, and Georgios Konstantinos Paparrizos as inventors, the entire disclosure of which is hereby incorporated herein by reference. The same switching regulator may be operated in a "boost" mode. In boost mode, the switching regulator may receive a voltage on the battery (at B) and generate a voltage that is greater than the battery voltage (e.g., to power up system electronics as described above). In another embodiment, separate buck and boost switching regulators may be used to deliver power between an external power source and the battery or between the battery and the system electronics as shown in FIG. 1B.

An advantage of some embodiments of the present invention pertains to powering up a system when the voltage on the battery is insufficient to power up the system electronics and the external power source is also insufficient to power up the system electronics. Some example external systems 110 may include power sources that initially provide a voltage sufficient to power up system electronics 101, but the initial maximum available current (sometimes referred to as the current limit) may not be sufficient to power up system electronics 101. Accordingly, as described above, switching regulator 103 may be operated in a boost mode to generate a voltage greater than the existing voltage on the battery. The boosted battery voltage may be coupled to the power supply terminal of system electronics 101 to allow the system electronics to power up. Once the system is powered up, system logic 102 may communicate with system logic 112 in external system 110 over data line(s) 106 so that external power source 111 may increase the maximum available current. External power source 111 may transition from a low current mode to one or more higher current modes, and thus more current is available for powering system electronics 101 and charging battery 150.

Electronic circuits according to embodiments of the present invention may receive voltage and current from external power source 111 and use the received external power to charge the battery 150 and drive the system electronics 101 at the same time. As described in more detail below, features and advantages of the present invention improve power delivery by controlling the current received from the external power source so that if the system electronics draw current in excess of the maximum current available from the external power source, the current between the external power source 111 and system electronics 101 is maintained at a controlled level. In one embodiment, the controlled current from the external system is supplemented by coupling the battery to the power supply input (Vcc) of system electronics 101 through switch 120 if the current drawn by the system electronics 101 increases beyond the maximum current available from the external power source.

Figure 2:
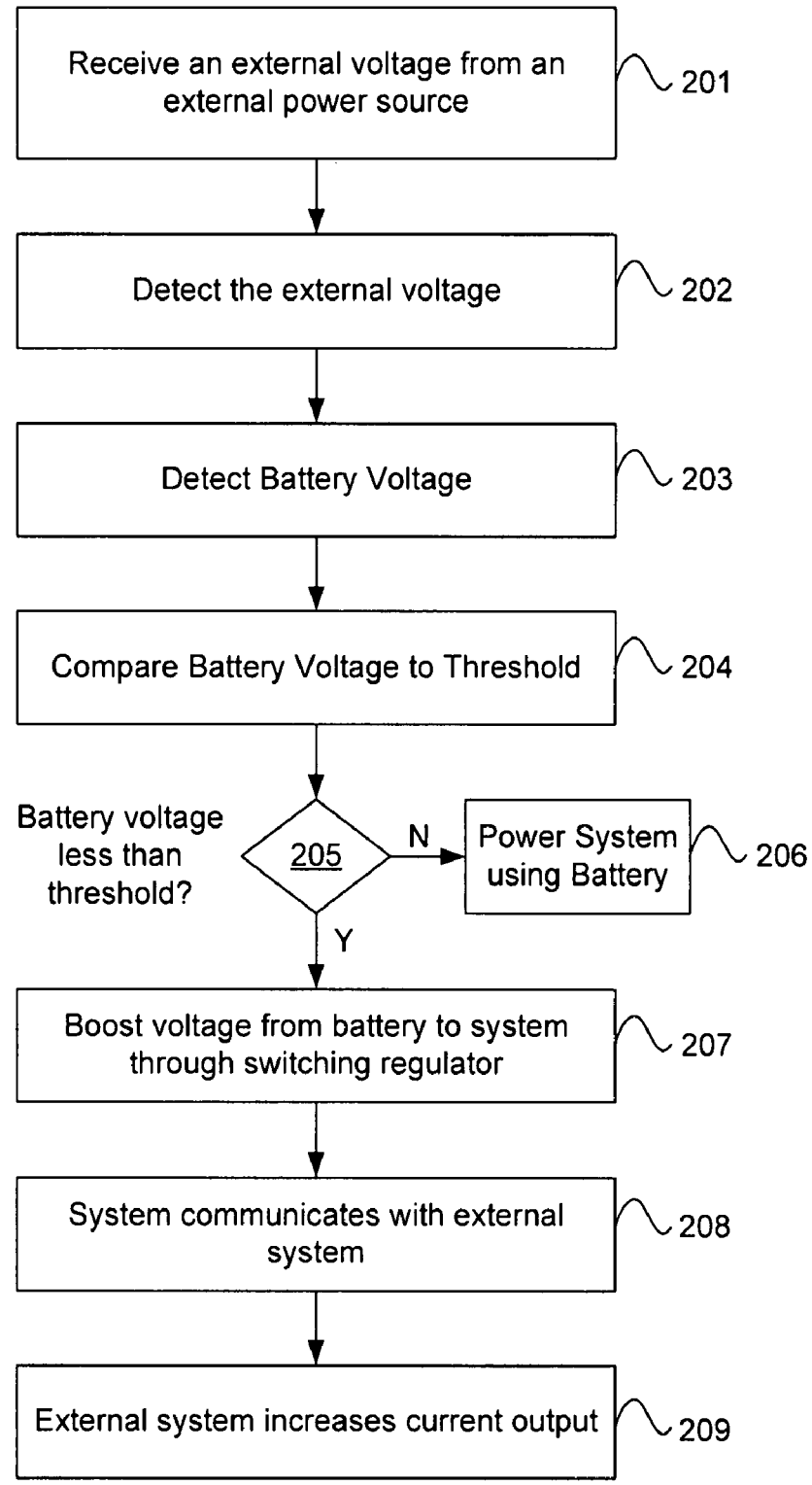
FIG. 2 illustrates a method according to one embodiment of the present invention.

FIG. 2 illustrates a method according to one embodiment of the present invention. At 201, an external voltage from a external power source is received on a circuit node. At 202, the external voltage may be detected. At 203, a battery voltage may be detected. At 204, the battery voltage may be compared to a threshold. For example, the threshold may be the minimum system threshold voltage for system electronics to be powered. At 205, a decision step represents alternate courses carried out by the electronic circuits if the battery voltage is less than or greater than the threshold. If the battery voltage is greater than the threshold, the system may be powered using the battery at 206. If the battery voltage is less than the threshold, the voltage on the battery is boosted using a switching regulator to another voltage level greater than the threshold and coupled to the system electronics at 207. At 208, the system may communicate with an external system. The external system increases current at 209.

Figure 3:
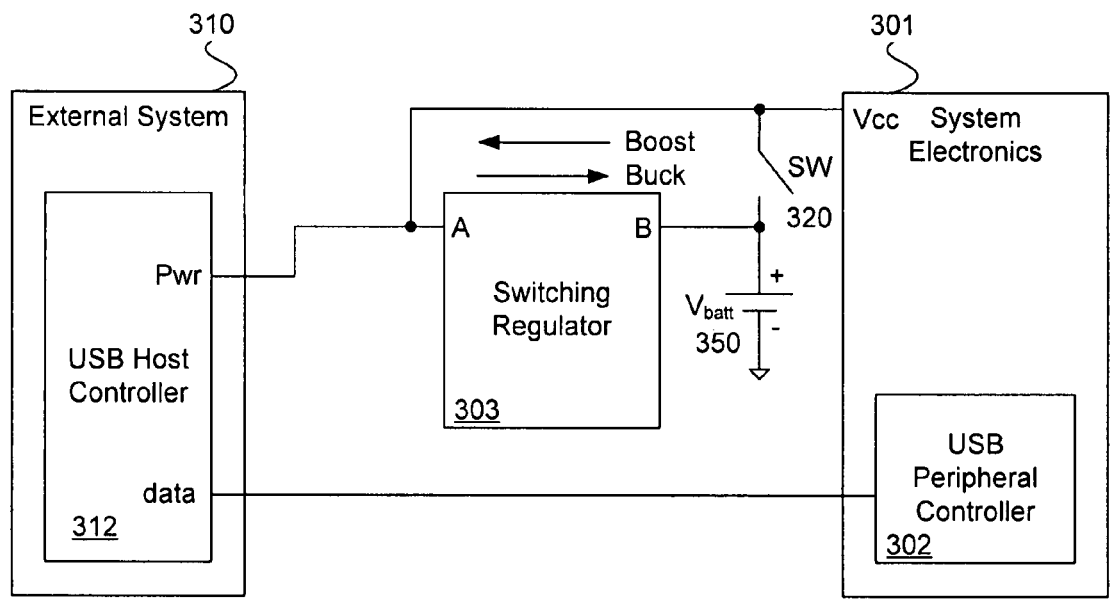
FIG. 3 illustrates a USB application of an electronic circuit according to one embodiment of the present invention.

FIG. 3 illustrates a USB application of an electronic circuit according to one embodiment of the present invention. In this example embodiment, an external system 310 includes a USB Host controller 312. A USB Host controller may include both a data terminal and a power terminal ("PWR"). The power terminal may be coupled to the power supply input of an electronic device to power system electronics 301 in the device. The electronic device may include a battery 350 that provides power to the system electronics 301 when no external power is available. System electronics may also receive power from other power sources such as AC wall adapters, which are not shown, and embodiments of the present invention may include power arbitration circuits for coupling one of a plurality of power sources to the system electronics. This example includes a bidirectional switching regulator 303 having a first terminal (A) coupled to the USB power source for receiving voltage and current and a second terminal (B) coupled to battery 350. The first terminal may also be coupled to the power supply terminal (Vcc) of system electronics 301. If the electronic device is coupled to the USB port on the external system, the USB Host controller will initially generate a voltage of about 5 volts and a maximum current (i.e., current limit) of 100 mA. USB Host controller 312 can generate 500 mA of current, which may be enough current to power system electronics 301 or charge battery 350, or both, but controller 312 may require data communication (e.g., enumeration) with a USB peripheral controller 302 included as part of system electronics 301 before controller 312 can transition from a low 100 mA current mode to a high 500 mA current mode. The initial 5 volts and 100 mA of current received from USB controller 312 may be insufficient to allow the system electronics 301 to power up. If battery 350 has a sufficient charge (i.e., a voltage level greater than the minimum system threshold voltage, e.g., 3.5 volts), then it may be used to power up system electronics 301 by closing switch 320. However, if the voltage on the battery is below the minimum threshold voltage (e.g., when the battery is depleted), then switching regulator 303 may be operated in boost mode, wherein the voltage on the battery is used to generate a voltage greater than the minimum system threshold voltage. The boosted voltage is coupled to the system electronics and used for power up. Once system electronics are powered up, USB peripheral controller 302 may communicate with USB Host controller 312, and the USB Host controller can increase the current limit to 500 mA. With more current available from the USB Host controller, an electronic device may have enough power to operate system electronics 301 and charge battery 350. Accordingly, switching regulator may be operated in buck mode, wherein the voltage received from the USB Host controller is used to generate voltages and currents to charge the battery. If system electronics 301 begin to draw more than the current limit of 500 mA, and if the battery is charged so that the voltage on the battery is greater than the minimum system threshold voltage, switch 320 may be closed to allow the system to be powered from the battery. If the voltage on the battery is less than the minimum system threshold voltage, the switching regulator may again operate in boost mode to provide power (e.g., current or voltage) to system electronics 301.

Figure 4:
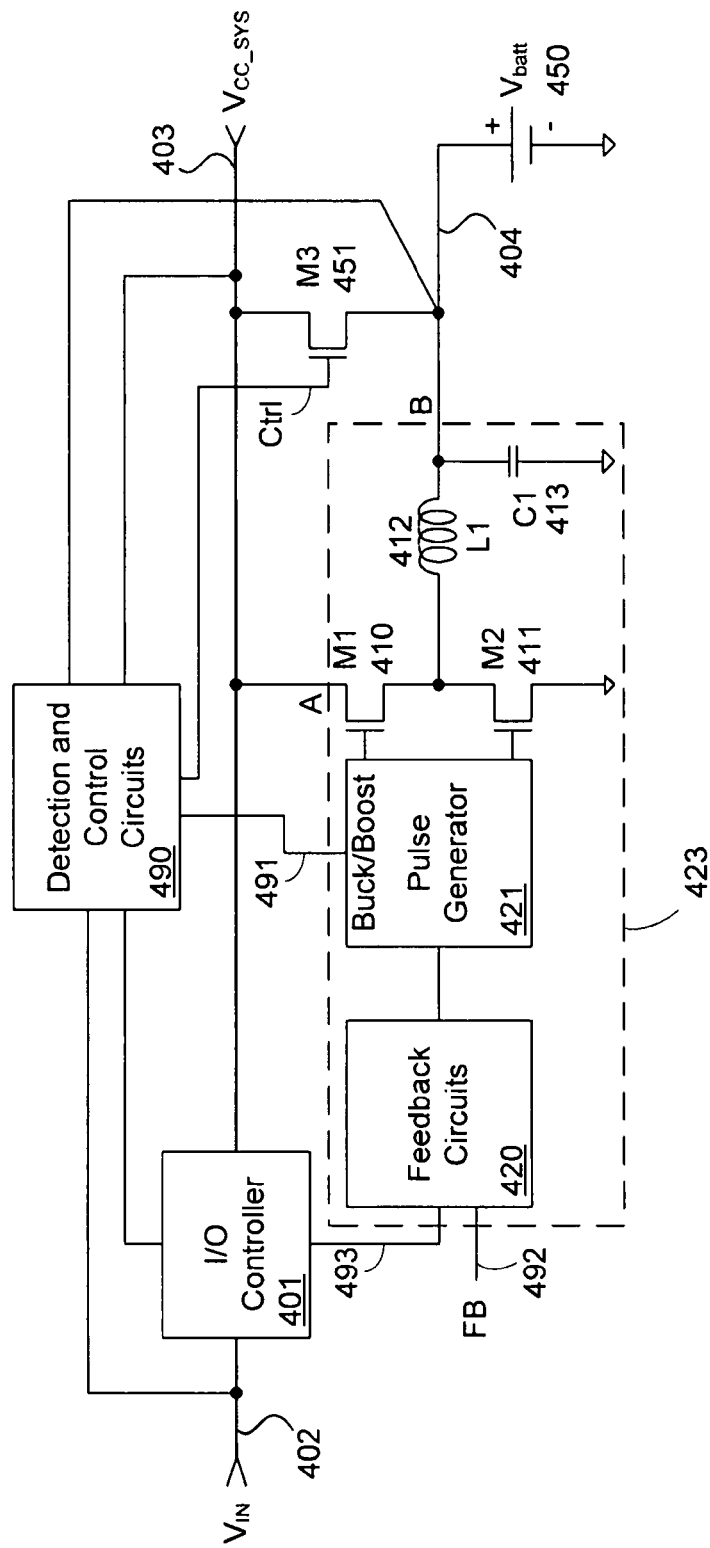
FIG. 4 illustrates another embodiment of the present invention.

FIG. 4 illustrates another embodiment of the present invention. In this embodiment, a circuit 400 including an input-output ("I/O") controller is coupled between the input terminal (i.e., input node) for receiving an external power source and the output terminal for providing voltages and currents to system electronics (not shown). Circuit 400 further includes detection and control circuits 490, inductor 412, capacitor 413, transistors 410 and 411, pulse generator 421, feedback circuits 420, and a switch transistor 451. In this example, a bidirectional switching regulator 423 comprises switching transistors 410 and 411, pulse generator 421 (e.g., a pulse width modulator), inductor 412, capacitor 413, and feedback circuits 420. Pulse generator 421 may include a "buck/boost" input 491 for configuring the bidirectional switching regulator into either a "buck" mode or a "boost" mode (e.g., based on detected voltage or current levels). Feedback circuits 420 may include inputs 492 or 493 for controlling the switching regulator based on the voltage or current at nodes 403 (i.e., for "boost" mode), 404 (i.e., for "buck mode), or based on signals received from input control circuit 401. It is to be understood that any of a variety of techniques and architectures may be used for implementing a bidirectional switching regulator. For example, one or more pulse generators may be used to drive the gates of switching transistors. A variety of feedback loop configurations may also be used, or different circuits for configuring the regulator into "buck" or "boost" mode may be used.

Circuit 400 is one example electronic circuit for supplying a power supply ("Vcc_sys") to system electronics or charging a battery 450, or both. Input node 402 may be coupled to an external power source (e.g., a USB power source) to receive an external voltage and current. Power from the external source may be delivered to the output node 403 for powering system electronics or to a second output node 404 for charging a battery, or both. Voltage or current from the external power source may be detected at node 402 by detection and control circuit 490, for example. Detection and control circuit 490 may also detect the voltage on battery 450. Control circuits 490 may detect the voltage at node 403 to determine when to turn on the transistor 451. In one embodiment, transistor 451 is turned on when the voltage at node 403 becomes less than the battery voltage at node 404 (e.g., by 25 mV). If the battery voltage is greater than a threshold to power up the system electronics, circuit 490 may close switch transistor 451 by changing the voltage on the gate of transistor 451 ("Ctrl"), thereby coupling the battery 450 to node 403 so that the system electronics can power up from the battery. Switch transistor 451 may be a low drain-to-source resistance FET transistor, for example. If circuit 490 detects a battery voltage below a threshold, circuit 490 may signal the switching regulator to operate in "boost" mode, wherein the voltage on the battery 450 at node 404 is used to generate another voltage at node 403 that is above the threshold for powering the system electronics. The threshold used for determining if the voltage on the battery is sufficient to power on the system electronics may be set by internal circuitry to a specified value above a known minimum system threshold voltage, for example. In one embodiment, boost mode may be initiated when the battery voltage is below a threshold (e.g., 3.5V) and the system logic 102 (e.g., in FIG. 1A or FIG. 1B) has not communicated with the external system to increase the current, and thus signals the circuit that higher currents are not available.

In one embodiment, when the system electronics are powering up, either using the battery voltage through transistor 451 or through the boost converter, I/O controller 401 may decouple node 402 from node 403 or regulate the current. For example, in one embodiment, I/O controller 401 may be a simple switch that is open when the system electronics are not powered up. After the system electronics are powered up, the switch may close, allowing current and voltage received from the external power source to be used to power the system and charge the battery. Alternatively, I/O controller 401 may regulate the current. For example, in a USB application, the I/O controller 401 may regulate the current to a maximum of 100 mA. Accordingly, if node 403 is pulled down by the load of the system electronics, the USB controller power source will not thereby also be pulled down. When the system electronics are powered up, either by the battery or by the boost converter, I/O controller 401 may increase the regulated current to a maximum of 500 mA for powering the system and charging the battery. By regulating the input current, the USB system will not be affected if the system electronics enter high current modes that cause the voltage on node 403 to drop below a desired range of values. For example, if the voltage at node 403 drops, the battery may supplement power through the transistor 451, while the input source is current limited by the I/O controller 401. Additionally, under high current load conditions the I/O controller 401 may also be used to control the switching regulator. For example, the system electronics may be power on and the switching regulator may be configured in buck mode to charge the battery. As the current into the system electronics approaches 500 mA, for example, the I/O controller may override other control loops so that as the current into the system electronics increases, the current into the switching regulator (i.e., at A) used to charge the battery decreases. In some embodiments, when the current drawn by system electronics exceeds a threshold, the switching regulator may be turned off so that all current from the external power source is provided to the system electronics.

Figure 5:
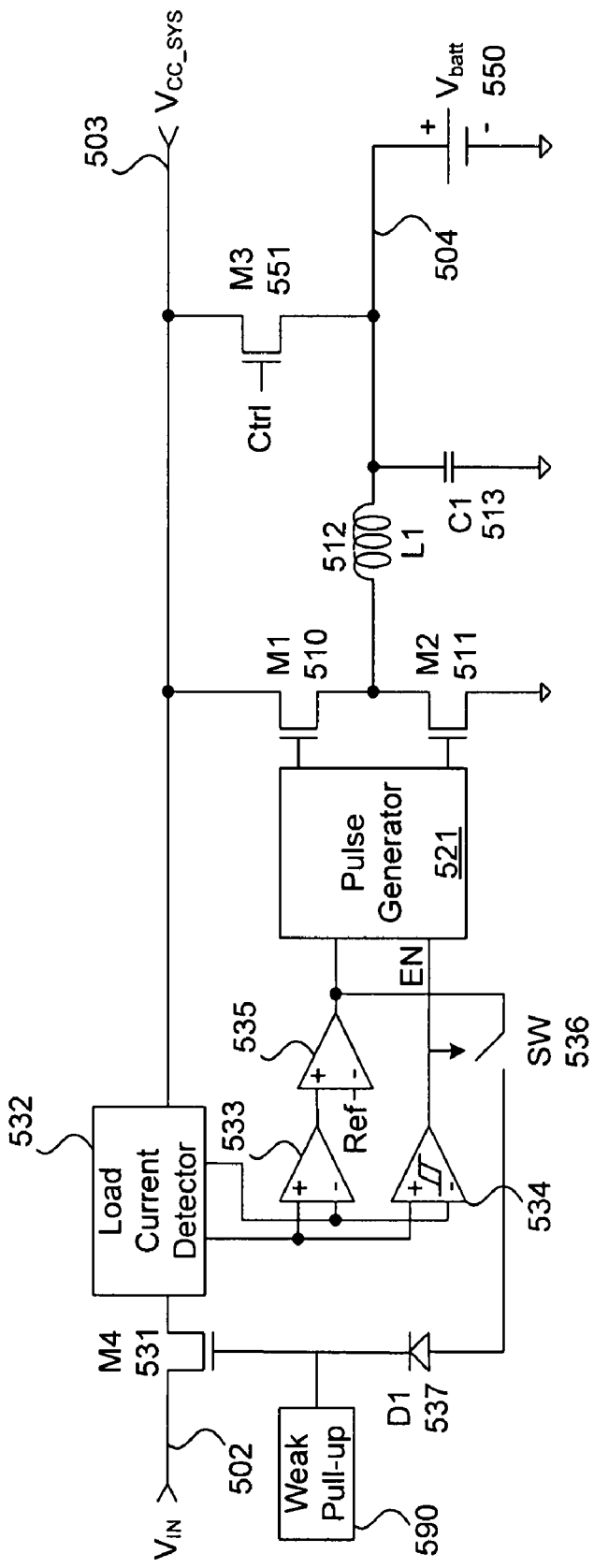
FIG. 5 illustrates a circuit including an example I/O controller according to one embodiment of the present invention.

FIG. 5 illustrates a circuit including an example I/O controller according to one embodiment of the present invention. In this example, I/O controller includes a transistor ("M4") 531, load current detector 532, amplifiers 533 and 535, comparator 535, switch circuit 536, and diode 537. Load current detector 532 may sense the current being drawn by device electronics (not shown) or the switching regulator, or both, and generate a voltage (e.g., a differential voltage) related to the load current. The voltage from the load current detector 532 is coupled to differential amplifier 533. The output of amplifier 533 is coupled to one input of differential amplifier 535. The other input of amplifier 535 is coupled to a reference control voltage to maintain the regulated current at a desired level, for example. The output of amplifier 535 drives pulse generator (e.g., a pulse width modulator) 521 to control the pulses (e.g., the duty cycle) of the converter. The voltage from the load current detector is also coupled to comparator 534. The output of comparator 534 is coupled to an enable (EN) input of the switching regulator (e.g., to turn off the pulse generator or other switching regulator circuit components). Comparator 534 may include an internal offset so that it only switches on when the received voltage is greater than some threshold, which may be programmable or set by circuit components, for example. When the detected load current increases to a particular value, the voltage from detector 532 will trigger comparator 534 and turn off the switching regulator. Comparator 534 may also activate a regulator loop that regulates the load current to a value determined by the circuit, thereby allowing the voltage at the output node 503 to drop without affecting the input node 502 and any attached external systems. In this example, the regulator feedback loop includes current detector circuit 532, amplifiers 533 and 535, a switch circuit 536, and diode 537 for controlling the current through transistor 531. In one embodiment, the I/O controller circuit will regulate the current across a range of load currents. For example, comparator 534 may include hysteresis so that if the feedback loop is activated by a particular load current, the feedback loop will remain active until the load current drops by a predetermined amount.

Additionally, the feedback loop may operate in two modes. In a first mode, the feedback loop may regulate current at a lower value than in a second higher current mode. For example, when a USB power source is initially connected to node 502, the regulator feedback loop may be configured in a lower current mode wherein the feedback loop is triggered to regulate a maximum load current of 100 mA. If the system electronics successfully communicate with the external USB system to increase the USB current to 500 mA, then the feedback loop may be reconfigured to a higher current mode wherein the feedback loop is configured to regulate a maximum load current of 500 mA. In one embodiment, the feedback loop in the I/O controller may be programmable so that a plurality of regulated current values may be achieved. It is to be understood that when switch 536 is open, the gate of transistor 531 may be coupled to an appropriate voltage to turn transistor 531 on to allow current to pass. For example, in one embodiment the gate of transistor 531 may be coupled through a weak pull-up circuit 590 to turn on transistor 531. The weak pull-up circuit may include a charge pump, for example, to raise the voltage on the gate above the voltage received on node 502 to ensure the device is turned on.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. For example, while the above disclosure illustrates transistors, it is to be understood that the transistors may be N-channel or P-channel FETs (e.g., MOS), or PNP or NPN bipolar device, for example. Based on the above disclosure and the following claims, other arrangements, embodiments, implementations and equivalents will be evident to those skilled in the art and may be employed without departing from the spirit and scope of the invention as defined by the claims. The terms and expressions that have been employed here are used to describe the various embodiments and examples. These terms and expressions are not to be construed as excluding equivalents of the features shown and described, or portions thereof, it being recognized that various modifications are possible within the scope of the appended claims.

What is claimed is:

1. An electronic circuit comprising:
an input to receive power from a Universal Serial Bus (USB) system;
a switching regulator having a first terminal and a second terminal, the first terminal configured provide power to system electronics, wherein the second terminal is coupled to a battery; and
a detection circuit to detect a voltage of the battery,
wherein, before enumeration with said USB system, when the voltage of the battery is below a first voltage level sufficient to power up said system electronics, and after the USB system is connected to said input, the switching regulator is configured to boost the voltage of the battery to provide a voltage and a current to said system electronics to power up said system electronics.

2. The electronic circuit of claim 1 wherein enumeration comprises a data communication with the USB system.

3. The electronic circuit of claim 1 wherein enumeration is between the system electronics and the USB system.

4. The electronic circuit of claim 1 wherein, before enumeration, the input of the electronic circuit receives a first current value, and wherein, after enumeration, the input of the electronic circuit receives a second current value.

5. The electronic circuit of claim 1 further comprising a switch coupled between a power supply terminal of the system electronics and the battery, wherein, before enumeration, when the voltage on the battery is above a threshold value, the switch is closed to provide a voltage and a current from the battery to said system electronics to power up said system electronics.

6. The electronic circuit of claim 1 wherein the switching regulator is a bidirectional switching regulator, and wherein the switching regulator is configurable to receive a voltage from the USB system and generate a voltage to the battery that is less than the voltage from the USB system.

7. The electronic circuit of claim 1 wherein the switching regulator comprises a boost switching regulator and a buck switching regulator, and wherein the switching regulator is configurable to receive a voltage from the USB system and generate a voltage to the battery that is less than the voltage from the USB system.

8. The electronic circuit of claim 1 wherein the switching regulator comprises:
a first transistor having a first terminal coupled to a power supply terminal of the system electronics, a second terminal coupled to a node, and a control terminal;
a second transistor having a first terminal coupled to the node, a second terminal coupled to a reference voltage, and a control terminal; and
a pulse generator having a first output coupled to the control terminal of the first transistor and a second output coupled to the control terminal of the second transistor, wherein the switching regulator is on an integrated circuit, and wherein the node is coupled to the battery through a filter external to the integrated circuit.

9. The electronic circuit of claim 1 further comprising:
a current detector to receive current from the USB system;
a transistor to receive current from the USB system;
an amplifier coupled to an output of the current detector; and
a comparator coupled to an output of the current detector, wherein the comparator alternately activates regulation of the switching regulator and regulation of current through the transistor,
wherein the amplifier is alternately configured in a regulation loop with the switching regulator and the transistor based on a detected current from the USB system.

10. The electronic circuit of claim 1 wherein, after enumeration, said input receives increased power from the USB system and couples said increased power to the system electronics.

11. The electronic circuit of claim 1 further comprising a regulator coupled between said input and the first terminal of the switching regulator, wherein, before enumeration, the regulator regulates current to a first maximum value, and wherein, after enumeration, the regulator regulates current to a second maximum value.

12. The electronic circuit of claim 1 further comprising a regulator coupled between said input and the first terminal of the switching regulator, wherein, after enumeration, the regulator receives power from the USB system and provides power to the system electronics and the switching regulator, and wherein the switching regulator charges the battery at the same time the system electronics receives power from the regulator.

13. The electronic circuit of claim 12 further comprising a control circuit, wherein, when a current drawn by the system electronics increases to a first current limit value of the regulator, the control circuit reduces a current into the switching regulator used to charge the battery.

14. The electronic circuit of claim 1 further comprising:
a regulator coupled between said input and the first terminal of the switching regulator; and
a switch coupled between the battery and a power supply terminal of the system electronics,
wherein, after enumeration, when a current drawn by the system electronics increases above a first current limit value of the regulator, a current from the USB system is maintained at a controlled level and supplemental current is received by the system electronics from the battery through said switch.

15. The electronic circuit of claim 1 further comprising a current detector coupled between said input and the system electronics.

16. The electronic circuit of claim 15 further comprising a first transistor coupled between said input and the system electronics, wherein the first transistor is configured to limit a current from the USB system if a current through the first transistor is greater than a first value.

17. The electronic circuit of claim 1 wherein the system electronics communicates with a USB controller, and in accordance therewith, the USB system increases a current provided to said input.

18. The electronic circuit of claim 1 further comprising an input control circuit configured between said input and a power supply terminal of the system electronics, wherein said input and said power supply terminal of the system electronics have different voltage values.

19. The electronic circuit of claim 18 wherein the input control circuit provides a regulated current to the system electronics.

20. The electronic circuit of claim 18 wherein the input control circuit detects a current and shuts down the switching regulator when the detected current is greater than a threshold.

21. The electronic circuit of claim 1 further comprising a switch configured between said input and the first terminal of the switching regulator, wherein the switch is open when the system electronics are not powered up.

22. The electronic circuit of claim 21 wherein the switch is closed after the system electronics are powered up.

23. The electronic circuit of claim 1 wherein the electronic circuit is an integrated circuit.

24. A method comprising:
   determining if an external power source of a USB system has sufficient power to power up system electronics, wherein the external power source of the USB system is connected to a circuit, the circuit comprising a switching regulator having a first terminal and a second terminal, the first terminal configured to provide power to the system electronics, and wherein the second terminal is coupled to a battery;
   detecting a voltage of the battery; and
   boosting, by the switching regulator, the voltage of the battery to provide a voltage and a current to said system electronics to power up said system electronics,
   wherein said boosting is performed before enumeration with said USB system when the voltage of the battery is below a first voltage level sufficient to power up said system electronics and after the external power source of the USB system is connected.

25. The method of claim 24 wherein enumeration comprises a data communication with the USB system.

26. The method of claim 24 wherein enumeration is between the system electronics and the USB system.

27. The method of claim 24 wherein, before enumeration, an input of the circuit receives a first current value from the USB system, and wherein, after enumeration, the input of the circuit receives a second current value from the USB system.

28. The method of claim 24 wherein, before enumeration, when the voltage on the battery is above a threshold value, the method further comprises coupling a voltage and a current from the battery to said system electronics through a switch to power up said system electronics.

29. The method of claim 24 wherein the switching regulator is a bidirectional switching regulator, and wherein the switching regulator is configurable to receive a voltage from the USB system and generate a voltage to the battery that is less than the voltage from the USB system.

30. The method of claim 24 wherein the switching regulator comprises a boost switching regulator and a buck switching regulator, and wherein the switching regulator is configurable to receive a voltage from the USB system and generate a voltage to the battery that is less than the voltage from the USB system.

31. The method of claim 24 wherein, after enumeration, an input of the circuit receives increased power from the USB system and couples said increased power to the system electronics.

32. The method of claim 24 further comprising regulating a current between an input of the circuit and the first terminal of the switching regulator, wherein, before enumeration, the current is regulated to a first maximum value, and wherein, after enumeration, the current is regulated to a second maximum value.

33. The method of claim 24 further comprising regulating a current between an input of the circuit and the first terminal of the switching regulator, wherein, after enumeration, a current from the USB system to the system electronics and the switching regulator is regulated, and wherein the switching regulator charges the battery at the same time the system electronics receives power.

34. The method of claim 33 further comprising reducing a current into the switching regulator used to charge the battery when a current drawn by the system electronics increases to a first regulated current limit value.

35. The method of claim 24 further comprising regulating a current between an input of the circuit and the first terminal of the switching regulator, wherein, after enumeration, when a current drawn by the system electronics increases above a first regulated current limit value, a current from the USB system is maintained at a controlled level and supplemental current is received by the system electronics from the battery through a switch.

36. The method of claim 24 further comprising detecting a first current between an input of the circuit connected to the USB system and the system electronics.

37. The method of claim 36 further comprising coupling the first current through a first transistor and limiting the first current if the first current is greater than a first value.

38. The method of claim 36 further comprising shutting down the switching regulator when the detected current is greater than a threshold.

39. The method of claim 24 wherein the system electronics communicates with a USB controller, and in accordance therewith, the USB system increases a current provided to said input.

40. The method of claim 24 further comprising opening a switch configured between an input of the circuit and the first terminal of the switching regulator when the system electronics are not powered up.

41. The method of claim 40 further comprising closing the switch after the system electronics are powered up.

42. The method of claim 24 wherein said determining comprises detecting an external voltage from the USB system.

43. The method of claim 24 wherein the electronic circuit is an integrated circuit.

* * * * *